Nov. 24, 1931.  W. H. BLOOMER  1,833,352
ARTICLE CONVEYER
Filed Jan. 6, 1930

INVENTOR.
WILLIAM H. BLOOMER.
BY
ATTORNEY.

Patented Nov. 24, 1931

1,833,352

UNITED STATES PATENT OFFICE

WILLIAM H. BLOOMER, OF BINGHAMTON, NEW YORK, ASSIGNOR TO BINGHAMTON FOUNDRY & MACHINE COMPANY, INC., OF BINGHAMTON, NEW YORK, A CORPORATION OF NEW YORK

ARTICLE CONVEYER

Application filed January 6, 1930. Serial No. 418,708.

My invention relates to article conveyers and to a means and method for efficiently conveying articles, such as doughnuts, cookies and the like, or other articles, free from contamination by contact with foreign surfaces and handling.

More particularly, the invention relates to an endless chain conveyer provided with baskets and driven by sprocket wheels; and the principal object is to provide an arrangement of the sprocket wheels, the path of travel of the chain, and the positioning of the baskets so that all the articles delivered to it are caught by the conveyer and that none are spilled on the floor, table, or the like, which would render the article unfit for use.

A still further object is to provide a conveyer wherein there is automatically effected an equal distribution of weight on the conveyer or chain, thereby obviating the jerks in the travel of the chain and consequent spilling of the articles, and wear on the parts of the device.

Another object is to provide a conveyer that can efficiently carry all the articles fed to it irrespective of the rate at, or quantity in which, they are fed, or relative rate of chain travel.

A further object of the device is to provide a conveyer that will automatically receive and convey efficiently the maximum quantity of articles, i. e., operate at its maximum capacity at varying rates of feeding.

Figure 1:
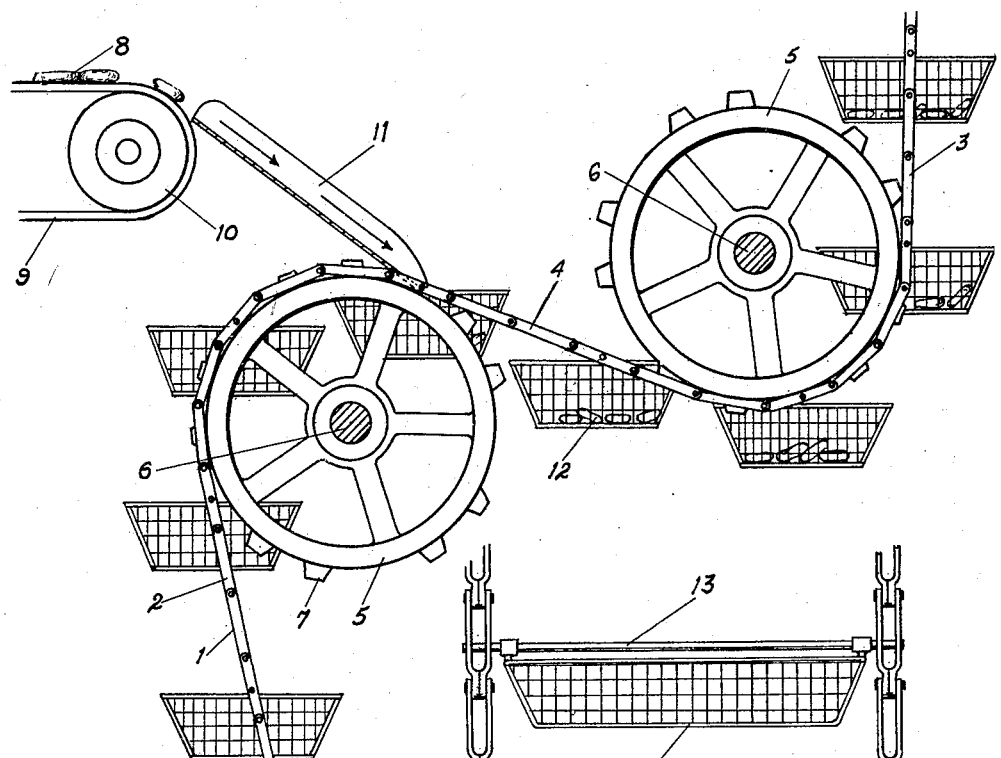
Figure 2:
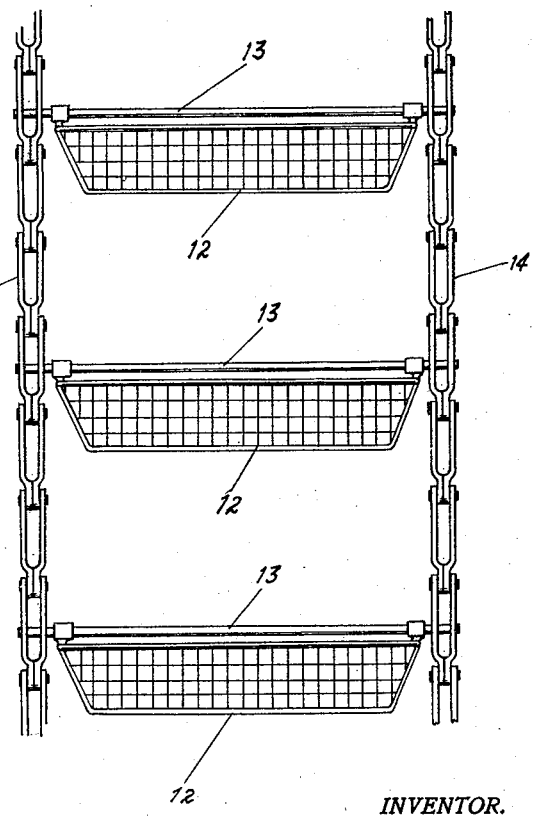

For the attainment of the foregoing objects and such other objects as may hereinafter appear or be pointed out, I have illustrated a preferred embodiment of the invention in the accompanying drawings, in which—
Figure 1 is a side elevation of the arrangement of the article conveyer belt, carrying baskets, and the adjacent endless feeding belt and chute; and Figure 2 is a front elevation of a section of the conveyer belt on a larger scale, showing in detail the mounting of the baskets on the belt.

I have illustrated my invention as applied to a conveyer for cooling doughnuts delivered to it from the cooking machine. Obviously, however, I do not limit myself to such use.

Referring to the drawings, 1 designates generally the conveyer belt which is shown to comprise spaced vertically traveling portions 2 and 3 and a downwardly inclined connecting portion 4. The driving means includes sprocket wheels 5 secured to any suitable support by means of shafts 6, and having teeth 7 irregularly spaced on the peripheries of said wheels. The wheels may be driven in any well known manner, as by gearing or sprocket and chain from a motor, or the belt 1 may be driven from another point and the wheels 5 used merely to direct the travel of the belt.

The doughnuts or other articles 8 are fed by endless belt 9 driven by pulley 10 and delivered down chute 11 onto the conveyer.

The articles are carried by baskets 12, shown in detail in Figure 2. The baskets are pivotally suspended on rods 13 so as to always maintain by gravity their normal article supporting position.

The conveyer is shown to comprise two spaced chains 14, and the chains carry the rods 13 between them.

At intervals along the peripheries of the sprocket wheels, wide spaces between the teeth are left to accommodate the links of the chain carrying the rods.

By virtue of the arrangement of the sprockets 5 and the portion 4 of the conveyer, it will be seen that in the portion 4 of the conveyer the baskets are arranged laterally one below the other, so that when a comparatively large supply of, say, doughnuts or the like is dropped and carried on the endless belt 8, such supply or pile travels down the chute 11 into the uppermost basket 12. Any overflow due to amount of articles delivered, or the speed of delivery, or force, is spilled over into the next lower basket, which is always in position to receive such overflow.

The belt 1 is driven at a constant rate of speed, and, irrespective of the variation of feed due to a varying speed of the endless belt 8 or a varying supply to the belt 8, the articles are automatically equally distributed along the conveyer belt 1. None of the articles are thus allowed to spill and be wasted.

Of course, changes may be made in detail of construction and arrangement of parts without departing from the spirit and scope of my invention. I do not limit myself therefore, to the form shown and described herein, other than by the appended claims.

What is claimed is:—

1. An article conveyer comprising spaced parallel chains and baskets pivotally carried between said chains, a sprocket over and in engagement with which said chains pass at one point of travel, a second sprocket, spaced from the first, under and in engagement with which said chains pass, and loading means for said baskets, said sprockets being so disposed with respect to the point of loading that the basket next in advance of the one being loaded underlies the latter in position to catch any overflow therefrom.

2. An article conveyer comprising spaced parallel chains and baskets pivotally carried between said chains, a sprocket, over and in engagement with the upper periphery of which said chains pass, a second sprocket spaced from the first and so positioned that its lower periphery, in engagement with which the chains pass, is disposed slightly lower than the upper periphery of said first sprocket, whereby said chains and baskets are inclined downwardly from said first to said second sprockets, loading means for said baskets at the upper portion of said incline, said incline positioning the basket next in advance of the one being loaded in an underlying position whereby to catch any overflow therefrom.

In testimony whereof, I affix my signature.

WILLIAM H. BLOOMER.